(12) United States Patent
Lee

(10) Patent No.: US 7,517,128 B2
(45) Date of Patent: *Apr. 14, 2009

(54) BACKLIGHT ASSEMBLY REMOVING DARK AREAS AND DISPLAY DEVICE PROVIDED WITH THE SAME

(75) Inventor: Ik-Soo Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/941,344

(22) Filed: Nov. 16, 2007

(65) Prior Publication Data

US 2008/0062717 A1 Mar. 13, 2008

Related U.S. Application Data

(63) Continuation of application No. 11/319,930, filed on Dec. 28, 2005, now Pat. No. 7,314,302.

(30) Foreign Application Priority Data

Jan. 3, 2005 (KR) ............... 10-2005-0000186

(51) Int. Cl.
*F21V 7/04* (2006.01)
(52) U.S. Cl. ............... 362/608; 362/621; 362/613
(58) Field of Classification Search ............... 362/603, 362/608, 558, 561, 626, 624, 612, 613
See application file for complete search history.

(56) References Cited

U.S. PATENT DOCUMENTS 7,101,070 B2 * 9/2006 Yu et al. ............... 362/558

FOREIGN PATENT DOCUMENTS

| CN | 1323069 | 11/2001 |
|---|---|---|
| CN | 1521521 | 8/2004 |

* cited by examiner

*Primary Examiner*—Ali Alavi
(74) *Attorney, Agent, or Firm*—F. Chau & Associates, LLC (57) ABSTRACT

A backlight assembly removing dark areas and a display device including the backlight assembly are provided. The backlight assembly includes a light source to emit light, and a light guiding plate which receives and guides the light emitted from the light source. A light diffusing area is formed in a light incident portion of the light guiding plate.

12 Claims, 7 Drawing Sheets

BACKLIGHT ASSEMBLY REMOVING DARK AREAS AND DISPLAY DEVICE PROVIDED WITH THE SAME

CROSS-REFERENCE TO RELATED APPLICATIONS

This application is a continuation of U.S. patent application Ser. No. 11/319,930, filed Dec. 28, 2005 now U.S. Pat. No. 7,314,302, which claims priority to Korean Patent Application No. 2005-0000186 filed, Jan. 3, 2005, the contents of which are herein incorporated by reference in their entireties.

BACKGROUND OF THE INVENTION (a) Technical Field

The present disclosure relates to a backlight assembly that removes dark areas, and more particularly, to a backlight assembly from which dark areas occurring in a light guiding plate (LGP) are removed when light is guided by the LGP and a display device provided with the backlight assembly.

(b) Discussion of the Related Art

Liquid crystal display (LCD) devices have decreased in size and weight and exhibit enhanced performance. As a result, demand for such display devices has increased.

LCD devices employing an LCD panel are small in size and weight, and consume low power. LCD devices are used in almost all information processing apparatuses requiring a display device and have become attractive as a substitute for cathode ray tubes (CRTs).

LCD devices change a molecular alignment of liquid crystal to different molecular alignments with the application of a voltage. As a result of the change in molecular alignment, a change in optical characteristics, such as birefringence, optical rotary power, dichroism, and optical scattering, of liquid crystal cells emitting light results in a visual change. That is, LCD devices are light receiving display devices which display data using modulation of light in the liquid crystal cells.

Specifically, small-sized LCD devices, such as displays on mobile phones, employ a light emitting diode (LED) with small volume, high emission efficiency, minimized power consumption, and strong resistance to outside impacts.

Light emitted from the LED is received and guided by the LGP and is supplied to an LCD panel built into the LCD device. Since the LED is a point light source, dark areas are generated between LEDs at an inlet of the LGP when the light emitted from the LEDs is incident on the LGP. For example, assuming the LGP is made of polymethyl methacrylate (PMMA) having a refractive index n of 1.49, when the light emitted from the LEDs having light directivity of 60° is incident from the air to the LGP, the light is incident on the LGP at an incidence angle of 35.5° by Snell's law.

At this incidence angle, dark areas are generated between the light emitting diodes, thereby deteriorating the light emission efficiency. The dark areas are generated at the edges of the LCD device, resulting in a screen that is dark and unable to show a clear image.

SUMMARY OF THE INVENTION

Embodiments of the present invention provide a backlight assembly capable of removing dark areas and a display device provided with the backlight assembly.

According to an embodiment of the present invention, there is provided a backlight assembly including a light source to emit light, and an LGP which receives and guides the light emitted from the light source. A light diffusing area is formed in a light incident portion of the LGP. The light diffusing area provided in the LGP may include a matrix including polymer resin or glass and a diffusing agent mixed in the matrix to diffuse incident light.

A content of the diffusing agent in the LGP may be in the range from about 0.01 wt % to about 10.00 wt %.

The diffusing agent may comprise one or more materials selected from a group consisting of polycarbonate and acrylic resin.

The LGP may further include a light guiding area for guiding the light and the light guiding area may be formed adjacent to the light diffusing area in the traveling direction of the light.

The light guiding area may comprise polymer resin or glass.

A plurality of concave portions and a plurality of protruded portions may be continuously provided on the light incident surface of the light guiding plate in a location opposed to the light source.

The light source may be a light emitting diode.

The light source may be a linear light source formed by arranging a plurality of light emitting diodes in parallel along the light incident surface of the light guiding plate.

According to another embodiment of the present invention, there is provided a display device including a panel unit for displaying an image, and a backlight assembly for supplying light to the panel unit. The backlight assembly includes a light source to emit the light and an LGP which receives and guides the light emitted from the light source. A light diffusing area is formed in a light incident portion of the LGP. The light diffusing area provided in the LGP may include a matrix including polymer resin or glass and a diffusing agent mixed in the matrix to diffuse incident light.

The panel unit may be a liquid crystal display panel.

The display device may be used in a mobile phone.

BRIEF DESCRIPTION OF THE DRAWINGS

Preferred embodiments of the present invention can be understood in more detail from the following descriptions taken in conjunction with the accompanying drawings, in which.

DETAILED DESCRIPTION OF THE PREFERRED EMBODIMENTS

Preferred embodiments of the present invention will now be described more fully hereinafter below in more detail with reference to the accompanying drawings, in which preferred embodiments of the invention are shown. This invention may, however, be embodied in different forms and should not be construed as limited to the embodiments set forth herein.

Figure 1:
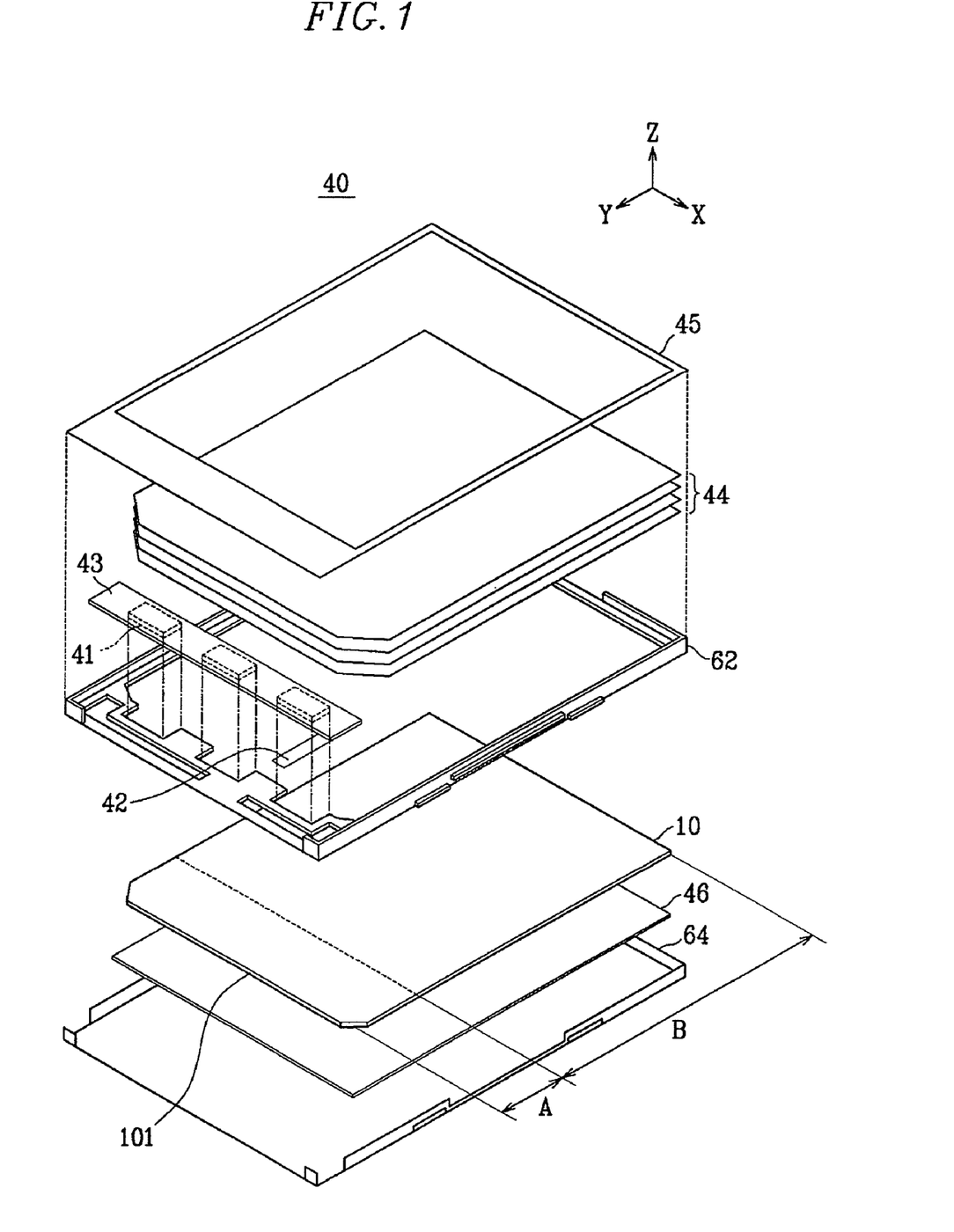
FIG. 1 is an exploded perspective view of a backlight assembly according to an embodiment of the present invention.

FIG. 1 shows a backlight assembly 40 for use in an LCD device such as a mobile phone display.

The backlight assembly 40 shown in FIG. 1 includes a light source 41 (shown as a dotted line), an LGP 10, a reflecting sheet 46, and optical sheets 44. The backlight assembly 40 is provided with a pressure sensitive adhesive (PSA) 45, a mold frame 62, and a bottom chassis 64, which fix and support the backlight assembly 40.

An LED mounted on a board 43 as the light source 41 is shown in FIG. 1. Alternatively, other types of point light sources may be used instead of the LED, such as, for example, a linear light source or a surface light source. Three light emitting diodes are shown in FIG. 1. Alternatively, the light emitting diode may be formed in quantities other than three.

Light emitted from the light source 41 is received and guided by the LGP 10. A light incident surface 101 is formed in the LGP 10. The light guided to the LGP 10 is guided in the upper direction (positive Z axis direction) through the LGP 10. Light traveling in the lower direction (negative Z axis direction) through the LGP 10 is reflected to an upper part of the backlight assembly 40 by the reflecting sheet 46, which is positioned below the LGP 10. The brightness of the light guided by the LGP 10 is enhanced and the light is supplied to the upper part to a plurality of optical sheets 44 are positioned above the LGP 10. The light source 41 is mounted on the board 43 and is electrically connected to a voltage source outside of the backlight assembly 40 by a connection unit 42 connected to the board 43. The light source 41 receives, and is driven by, a drive voltage.

The LGP 10 and the optical sheets 44 are fixed by a mold frame 62. A bottom chassis 64 is positioned below the mold frame 62 and fixes the reflecting sheet 46. The PSA 45 is attached on the mold frame 62 and fixes inside components of the backlight assembly 40, which are positioned in the lower part of the backlight assembly 40.

A light diffusing area A and a light guiding area B are provided in the LGP 10 as shown in FIG. 1. The light diffusing area A evenly diffuses light which passes through a light incident surface 101 of the LGP 10. The light diffusion area A is formed in a light incident portion. The light incident portion is an area which begins from an edge of the light incident surface 101 and extends toward the inner portion of the LGP 10. The diffusing area A may guide the incident light.

The light guiding area B is provided next to the light diffusing area A along the main traveling direction of the light (Y axis direction). Therefore, light is evenly guided all over the LGP 10. As a result, evenly distributed light can be supplied to the upper part of the backlight assembly 40.

Figure 2:
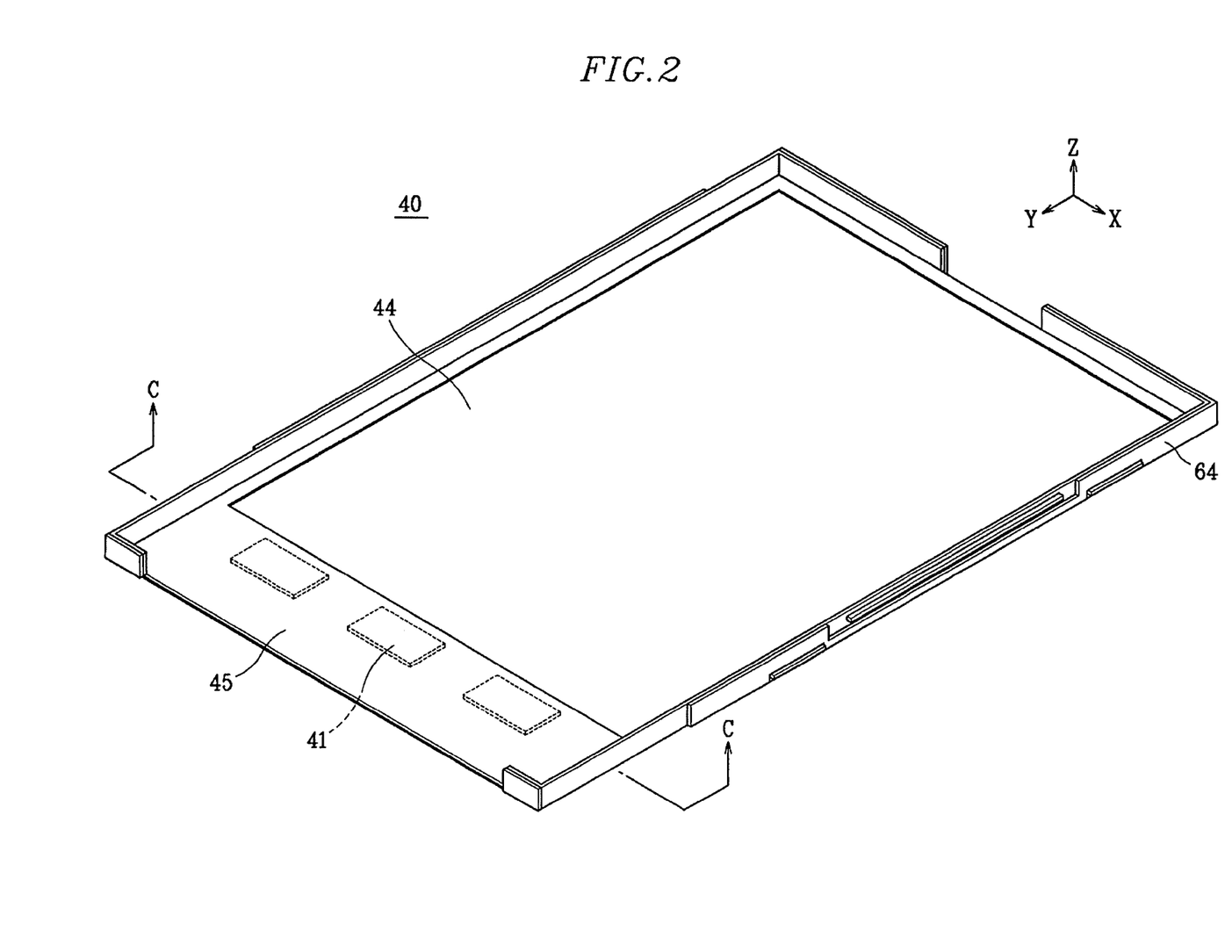
FIG. 2 is an assembled perspective view of a backlight assembly according to an embodiment of the present invention.

FIG. 2 shows a combined state of all components of the backlight assembly 40 shown in FIG. 1.

After light emitted from the light source 41 (shown as a dotted line) is evenly diffused while being guided through the LGP 10, it is supplied in the upper direction (positive Z axis direction). Therefore, a clear image can be displayed in, for example, a panel unit, which is provided in the upper part of the backlight assembly 40.

Figure 3:
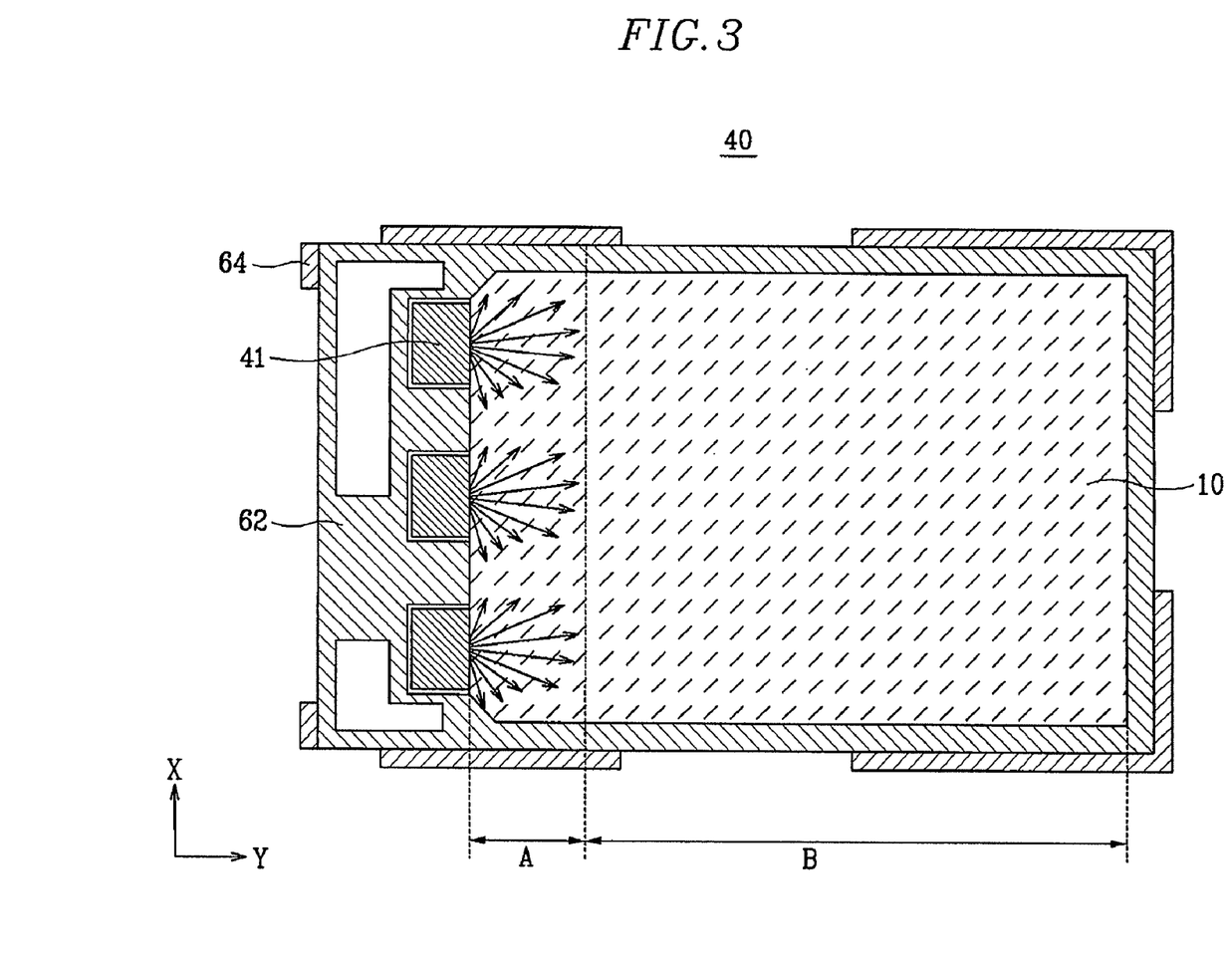
FIG. 3 is a cross-sectional view taken along line CC shown in FIG. 2.

FIG. 3 shows a cross-section taken along line CC shown in FIG. 2. FIG. 3 shows a state whereby the light emitted from the light source 41 is incident on the LGP 10 and is diffused in the light diffusing area A. The light emitted from the light source 41 is incident on the light diffusing area A of the LGP 10 and is diffused in the direction of the arrows. Dark areas are not generated in portions of the LGP 10 positioned between the light sources 41 because the light is evenly diffused in all portions of the light diffusing area A.

The LGP 10 includes the light diffusing area A and the light guiding area B. Light which is applied from the light source 41 to the LGP 10 is diffused in the direction of the arrows in the diffusing area A. Although not shown by an arrow in the light guiding area B, the light is guided to the end of the LGP 10 in the Y axis direction.

The light diffusing area A includes a matrix and a diffusing agent which diffuses the incident light and which is mixed into the matrix. The light diffusing area A may include other components. The matrix includes a ground material as a base and can be made of, for example, polymer resin or glass. PMMA is an example of a polymer resin. One or more materials, such as polycarbonate and acrylic resin, can be selected as a diffusing agent. The diffusing agent performs a function of diffusing the light that is incident on the LGP 10.

It is preferable that the content of the diffusing agent in the LGP 10 be in the range from about 0.01 wt % to about 10.00 wt %. A diffusing ratio of the light which is incident on the LGP 10 is lowered when the content of the diffusing agent in the LGP 10 is less than about 0.01 wt %. As a result, dark areas are generated in the portions of the LGP 10 positioned between the light sources 41. When the content of the diffusing agent in the LGP 10 is more than about 10.00 wt %, light is not well guided in the light guiding area B because the light is excessively diffused. Accordingly, the light cannot be evenly supplied to an upper part of the backlight assembly 40.

The light guiding area B next to the light diffusing area A includes polymer resin or glass. A diffusing agent is not mixed in the light guiding area B. Therefore, light is not diffused in the light guiding area B and may be guided to the end of the LGP 10 in the Y axis direction. Therefore, light can be evenly supplied on the whole surface of the backlight assembly 40.

The LGP 10 can be made by a double injection molding method. First, polymer resin chips such as, for example, PMMA are heated and melted and then the diffusing agent is added to the melted polymer resin chips. By such a method, a mixture is made in which the diffusing agent is evenly distributed in the polymer resin. Next, the mixture is poured into a mold for manufacturing the LGP. After some of the mixture is poured, melted polymer resin chips are poured into the mold. An LGP removed from the mold, after manufacturing by the aforementioned method, is divided into a light diffusing area A and a light guiding area B.

Although the light diffusing area A and the light guiding area B of the LGP 10 are divided as shown in FIG. 3, the light diffusing area A and the light guiding area B can be formed in other configurations.

Figure 4:
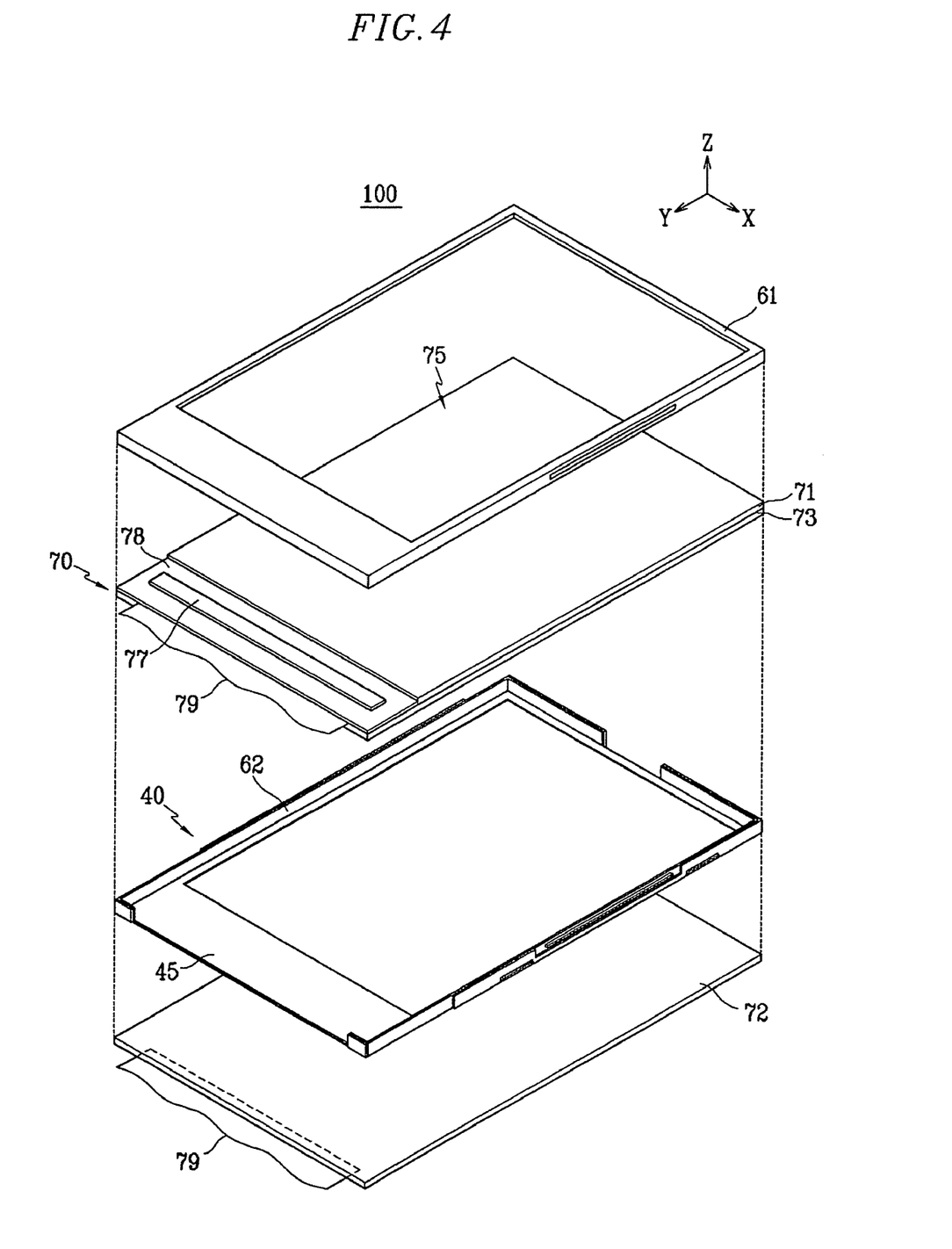
FIG. 4 is an exploded perspective view of a display device provided with a backlight assembly according to an embodiment of the present invention.

FIG. 4 is an exploded perspective view of a display device 100 for use in, for example, a mobile phone.

An LCD panel 75 is shown as a panel unit for use in a display device as shown in FIG. 4 Alternatively, other light receiving panel units can be used instead of an LCD panel.

The display device shown in FIG. 4 includes a top chassis 61, an LCD panel assembly 70, a backlight assembly 40, and a printed circuit board (PCB) 72. The LCD panel assembly 70 includes an LCD panel 75, an integrated circuit chip (IC chip) 77, and a flexible printed circuit (FPC) 79. The backlight assembly 40 guides and supplies light to the LCD panel 75, and the LCD panel assembly 70 that is positioned above the backlight assembly 40 controls the LCD panel 75 for displaying an image.

The LCD panel 75 includes a TFT panel 73 including a plurality of thin film transistors (TFT), a color filter panel 71 that is positioned over the TFT panel 73, and liquid crystal (not shown) injected between the TFT and color filter panels. The IC chip 77 is mounted on the TFT panel 73 and controls the LCD panel 75, and is protected by a protective film 78 which coats the perimeter of the IC chip 77.

The TFT panel 73 is a transparent glass panel in which a thin film transistor having a matrix shape is formed. A data line is connected to a source terminal of the TFT panel 73, and a gate line is connected to a gate terminal. A pixel electrode including transparent indium tin oxide (ITO) as a conductive material is formed in a drain terminal. A data line and a gate line of the LCD panel 75 are connected to the FPC 79. If an electrical signal is input from the FPC 79, the electrical signal is input to the source terminal and the gate terminal of the TFT, and the TFT is turned on or off by the input of the electrical signal. Therefore, an electrical signal required for forming a pixel is output to the drain terminal. The FPC 79 receives a video signal from the PCB 72 and applies each drive signal to the data line and the gate line of the LCD panel 75.

On the other hand, a color filter panel 71 is arranged in an upper part of the display device 100 opposite to the TFT panel 73. The color filter panel 71 is a panel in which an RGB pixel, which is a color pixel displaying a predetermined color when light passes, is formed by a thin film forming process. A common electrode including ITO is coated on the whole surface of the color filter panel 71. An electric field is formed between the pixel electrode of the TFT panel 73 and the common electrode of the color filter panel 71 when power is applied to the gate terminal and the source terminal of the TFT and the thin film transistor turns on. An array angle of liquid crystal injected between the TFT panel 71 and the color filter panel 73 is changed by the electric field and light transmission changes depending on the changed array angle, whereby a desired pixel is obtained.

The FPC 79 generates a plurality of timing signals for applying a data driving signal and a gate driving signal for driving the display device 100 in proper time. The gate and data driving signals are applied to the respective gate and data lines of the LCD panel 75. The FPC 79 is shown in a cut state in FIG. 4, and is in a connected state when in use.

The top chassis 61 fixes the LCD panel 75 on the backlight assembly 40.

It is possible to display a clear image in the LCD panel 75 because the backlight assembly 40 shown in FIG. 4 supplies light without generating a dark area. Specifically, it is possible to watch a high quality image on the LCD panel 75 because the supplied light has enhanced brightness and is evenly distributed.

Figure 5:
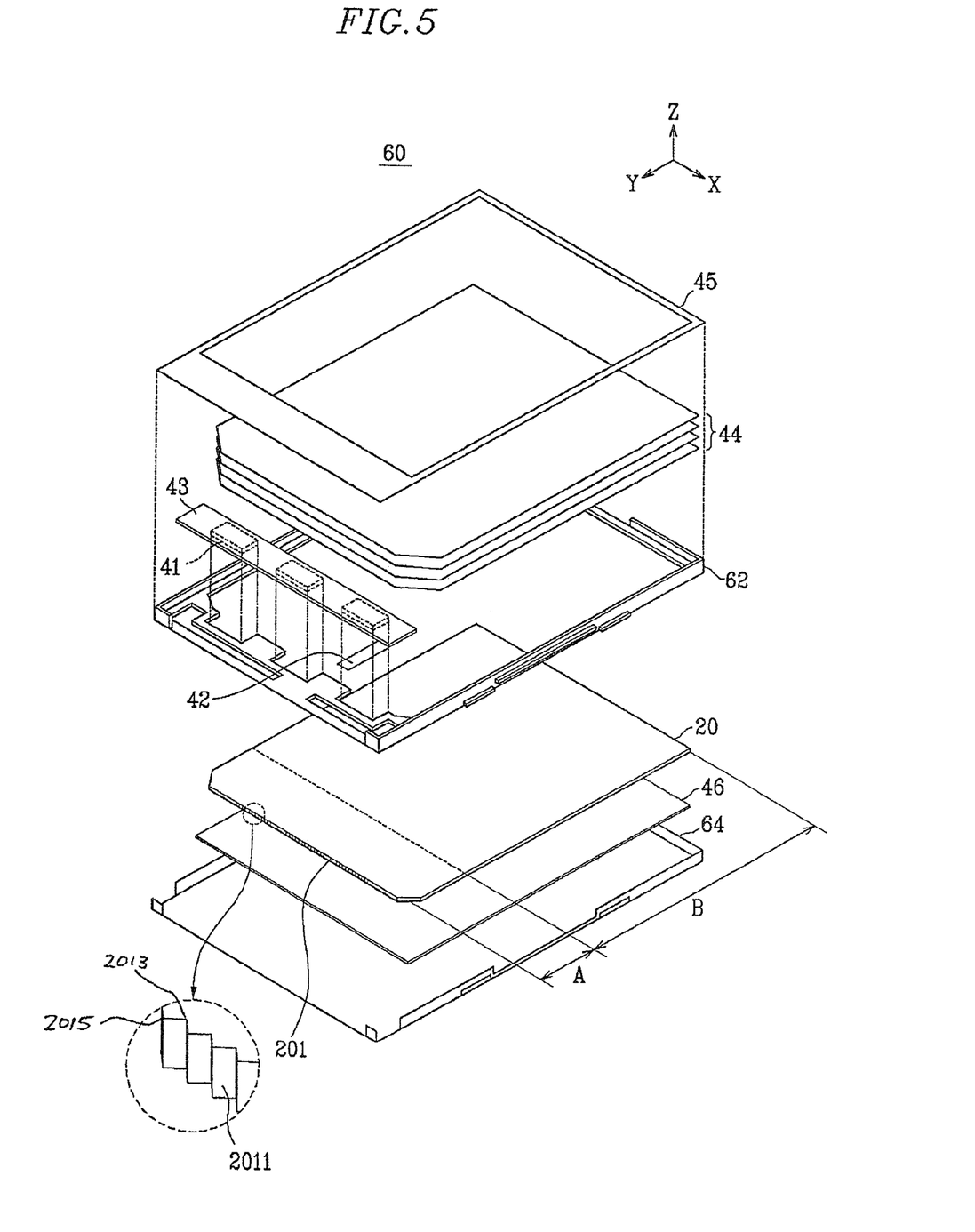
FIG. 5 is an exploded perspective view of a backlight assembly according to an embodiment of the present invention.

FIG. 5 is an exploded perspective view of the backlight assembly 70 provided with another type of LGP 20.

The backlight assembly 60 shown in FIG. 5 has substantially the same structure as the backlight assembly according to the embodiment of the present invention shown in FIG. 1, with the exception of the LGP 20.

In the LGP 20, a plurality of concave portions 2013 and protruded portions 2015 are continuously formed on the light incident surface 201 opposite to the light source 41. The plurality of concave portions 2013 and protruded portions 2015 form a serration portion 2011. Therefore, the light which is incident on the LGP 20 is firstly physically diffused. Then, the light is diffused again while passing through the light diffusing area A of the LGP 20. No dark areas are generated in the LGP 20 due to the diffusion of the light and first and second stages. Therefore, light, which is evenly distributed on the whole surface of the LGP 20, can be supplied to an upper part of a display device.

Figure 6:
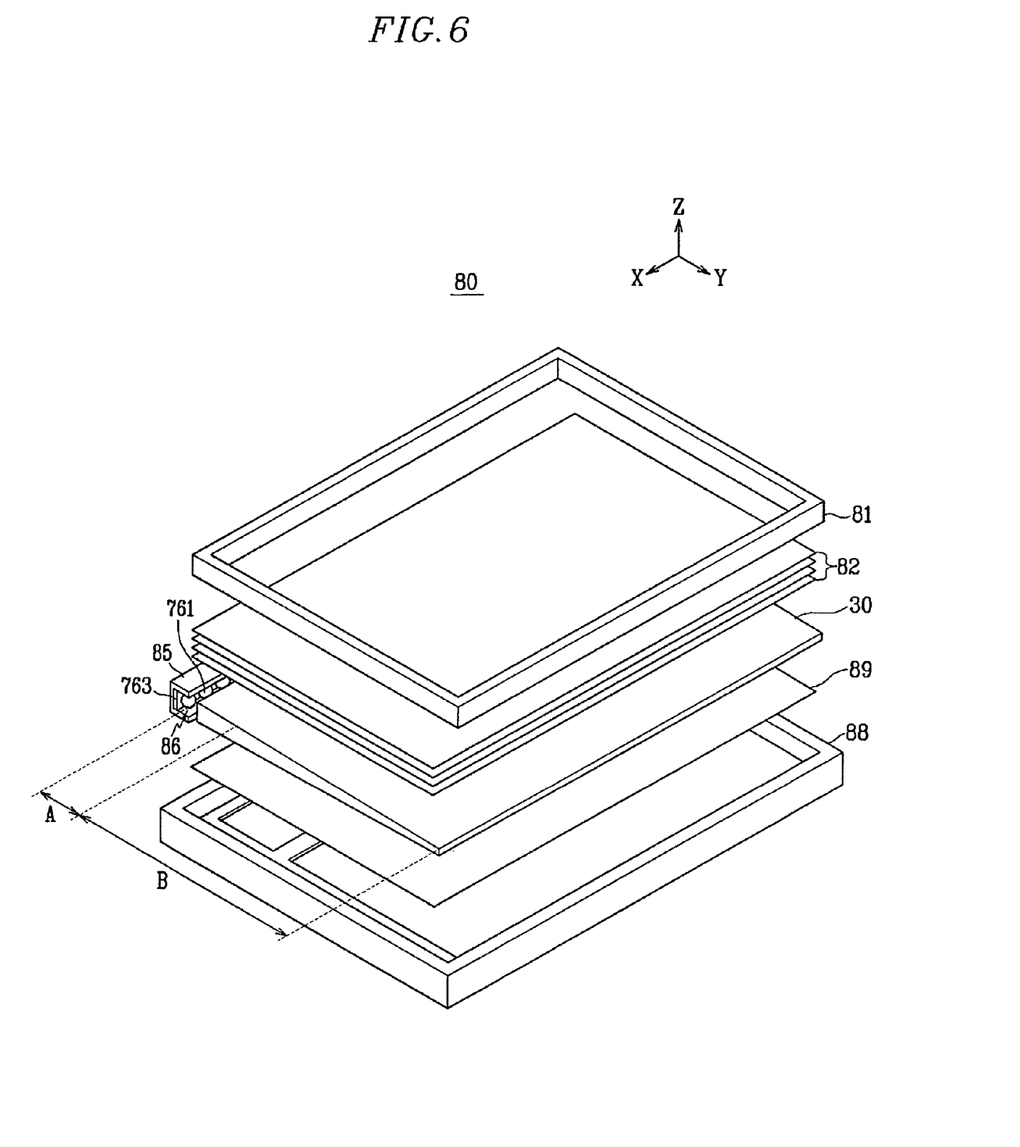
FIG. 6 is an exploded perspective view of a backlight assembly according to an embodiment of the present invention.

FIG. 6 shows a backlight assembly 80 according to an embodiment of the present invention. The backlight assembly 80 is formed in as a wedge type and has a linear light source.

The backlight assembly 80 includes a light source 86, a light source cover 85, an LGP 30, optical sheets 82, and a reflecting sheet 89. An upper mold frame 81 and a lower mold frame 88 are provided in an upper part and a lower part, respectively, of the backlight assembly 80 to fix and support the inside components. Therefore, the light source 86 can be firmly received and can be resistant to outside impacts.

The light source 86 is a linear light source and is formed by arranging a plurality of LEDs 761 in parallel along a light incident surface of the LGP 30. The plurality of LEDs 761 are mounted on a board 763 and are driven by an externally applied drive voltage. The plurality of LEDs 761 are evenly mixed with red color R LEDs, green color G LEDs, and blue color B LEDs.

The light diffusing area A is formed in a light incident surface of the LGP 30. Therefore, different color light emitted from each LED can be mixed while diffusion occurs in the light diffusing area A. As a result, white light with high brightness can be obtained. The white light obtained by such a method is guided while passing through the light guiding area B of the LGP 30. The light is evenly guided because patterns (not shown in FIG. 6) are formed in a lower surface of the LGP 30.

As described above, light with enhanced brightness is obtained by using the LGP 30 having the light diffusing area A. The LGP 30 provided with the light diffusing area A can be applied to the backlight assembly 80 having the linear light source.

Figure 7:
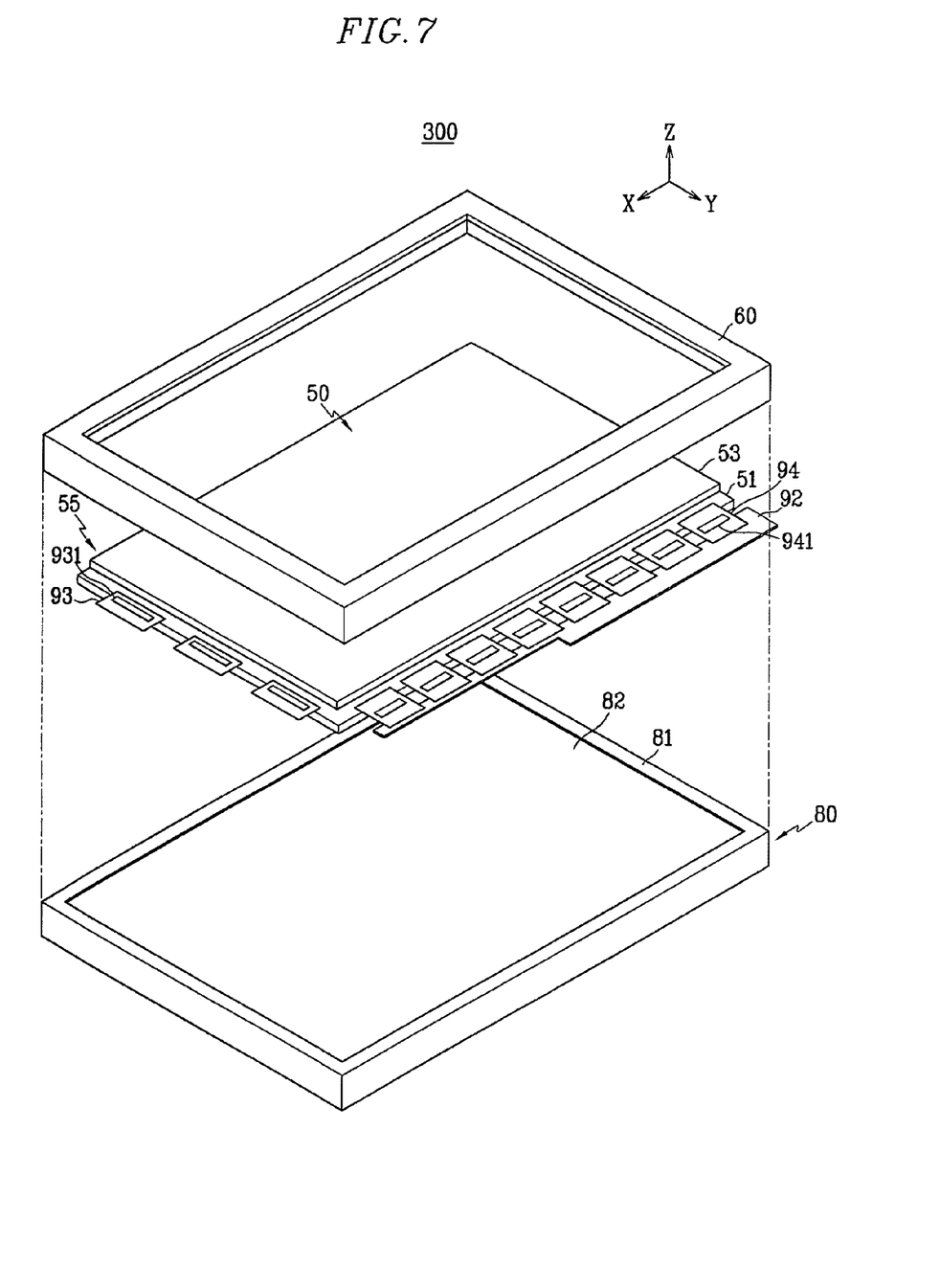
FIG. 7 is an exploded perspective view of a display device provided with a backlight assembly according to an embodiment of the present invention.

FIG. 7 is an exploded perspective view of a display device 300 provided with the backlight assembly 80 according to an embodiment of the present invention. The display device 300 uses an LCD panel 50 as a panel unit.

As shown in FIG. 7, the LCD panel 50 includes a TFT panel 51, a color filter panel 53, and liquid crystal (not shown) injected between the TFT and color filter panels 51, 53. A structure and a function of the LCD panel 50 is the same as those of the LCD panel 75.

Driver IC packages 93, 94 on which IC chips 931 and 941 are mounted, respectively, are attached on the TFT panel 51. The driver IC packages 93, 94 can be, for example, a chip on film (COF) or a tape carrier package (TCP). A driving signal that is transmitted from the PCB 92 is applied to the gate line and the data line formed on the TFT panel 51 through the driver IC packages 93, 94, whereby the LCD panel 50 is driven. A control board (not shown) provided in the lower part of the backlight assembly 80 generates a driving signal, and transmits the driving signal to the PCB 92. A clear image can be displayed on the LCD panel 50 because the light, which is evenly diffused and in which the brightness is enhanced, is supplied from the backlight assembly 80.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed:

1. A display device comprising:
a panel unit to display an image; and
a backlight assembly to supply light to the panel unit,
wherein the backlight assembly comprises a light source to emit the light and a light guiding plate which receives and guides the light emitted from the light source, and
wherein a light diffusing area is formed in a light incident portion of the light guiding plate, and the light diffusing area comprises a diffusing agent and a serration portion positioned opposite to the light source.

2. The display device of claim 1, wherein a content of the diffusing agent in the light guiding plate is in the range from about 0.01 wt % to about 10.00 wt %.

3. The display device of claim 1, wherein the diffusing agent comprises at least one of polycarbonate or acrylic resin.

4. The display device of claim 1, wherein:
the light guiding plate includes a light guiding area to guide the light; and
the light guiding area is formed adjacent to the light diffusing area in a traveling direction of the light, wherein the light guiding area begins at the inner portion of the light guiding plate where the light diffusing area ends.

5. The display device of claim 4, wherein the light guiding area comprises polymer resin or glass.

6. The display device of claim 1, wherein a plurality of concave portions and a plurality of protruded portions are continuously formed in the light incident surface of the light guiding plate.

7. The backlight assembly of claim 6, wherein the plurality of concave portions and the plurality of protruded portions are positioned opposite to the light source.

8. The display device of claim 1, wherein the light source is a light emitting diode.

9. The display device of claim 1, wherein the light source is a linear light source formed by arranging in parallel a plurality of light emitting diodes along a light incident surface of the light guiding plate.

10. The display device of claim 1, wherein the panel unit is a liquid crystal display panel.

11. The display device of claim 1, wherein the display device is used in a mobile phone.

12. The display device of claim 1, wherein the light diffusing area comprises a matrix including polymer resin or glass and the diffusing agent mixed in the matrix to diffuse incident light, and the light diffusing area extends from an edge of the light guiding plate to end at an inner portion of the light guiding plate.

* * * * *